(12) United States Patent
Park et al.

(10) Patent No.: US 11,591,460 B2
(45) Date of Patent: Feb. 28, 2023

(54) RADIATION CROSSLINKING EPDM COMPOSITION AND CABLE PRODUCED THEREBY

(71) Applicant: KYUNGSHIN CABLE, Cheonan-si (KR)

(72) Inventors: Seong Geun Park, Cheonan-si (KR); Cheol Hyun Park, Cheonan-si (KR)

(73) Assignee: KYUNGSHIN CABLE, Cheonan-si (KR)

( * ) Notice: Subject to any disclaimer, the term of this patent is extended or adjusted under 35 U.S.C. 154(b) by 330 days.

(21) Appl. No.: 16/644,924

(22) PCT Filed: Sep. 4, 2018

(86) PCT No.: PCT/KR2018/010292
§ 371 (c)(1),
(2) Date: Mar. 5, 2020

(87) PCT Pub. No.: WO2019/050253
PCT Pub. Date: Mar. 14, 2019

(65) Prior Publication Data
US 2021/0070972 A1    Mar. 11, 2021

(30) Foreign Application Priority Data

Sep. 7, 2017    (KR) .................. 10-2017-0114596

(51) Int. Cl.
| | | |
|---|---|---|
| C08L 23/16 | (2006.01) | |
| C08L 23/08 | (2006.01) | |
| C08L 23/26 | (2006.01) | |
| C08L 83/04 | (2006.01) | |
| C08K 3/016 | (2018.01) | |
| C08K 3/22 | (2006.01) | |
| C08K 9/06 | (2006.01) | |
| C08K 5/3492 | (2006.01) | |
| C08J 3/12 | (2006.01) | |
| C08F 222/10 | (2006.01) | |
| C08J 3/28 | (2006.01) | |
| C08K 5/00 | (2006.01) | |
| H01B 13/14 | (2006.01) | |

(52) U.S. Cl.
CPC .......... *C08L 23/16* (2013.01); *C08F 222/103* (2020.02); *C08J 3/12* (2013.01); *C08J 3/28* (2013.01); *C08K 3/016* (2018.01); *C08K 3/22* (2013.01); *C08K 5/005* (2013.01); *C08K 5/34924* (2013.01); *C08K 9/06* (2013.01); *C08L 23/0853* (2013.01); *C08L 23/26* (2013.01); *C08L 83/04* (2013.01); *H01B 13/14* (2013.01); *C08K 2003/222* (2013.01); *C08K 2003/2224* (2013.01); *C08K 2003/2227* (2013.01); *C08K 2003/2296* (2013.01); *C08L 2203/30* (2013.01); *C08L 2205/025* (2013.01); *C08L 2205/035* (2013.01); *C08L 2312/06* (2013.01)

(58) Field of Classification Search
CPC .......... C08L 23/16; C08L 23/26; C08L 83/04; C08L 2205/025; C08L 2205/035; C08L 2312/06; C08L 2203/30; C08L 23/0853; C08K 2003/222; C08K 3/016; C08K 3/22; C08K 9/06; C08K 5/3494; C08K 5/005; C08K 2003/2227; C08K 2003/2224; C08K 2003/2296; C08J 3/28; C08F 222/103; H01B 13/14
See application file for complete search history.

(56) References Cited

FOREIGN PATENT DOCUMENTS

| | | | |
|---|---|---|---|
| CN | 101914236 | 12/2010 | |
| JP | 2016-533623 | * 10/2016 | .............. C08K 3/22 |
| KR | 10-2005-0116053 | 12/2005 | |
| KR | 10-1496967 | 3/2015 | |
| KR | 10-2017-0005294 | 1/2017 | |
| KR | 10-2017-0041824 | 4/2017 | |
| KR | 10-1496967 | * 3/2018 | .............. C08L 23/00 |

OTHER PUBLICATIONS

International Search Report and Written Opinion issued in Corresponding International Patent Application No. PCT/KR2018/010292, dated Dec. 7, 2018.
Office Action issued in Corresponding Chinese Application No. 201880056568.1, dated Nov. 30, 2021.

* cited by examiner

*Primary Examiner* — Robert D Harlan
(74) *Attorney, Agent, or Firm* — Norton Rose Fulbright US LLP

(57) ABSTRACT

Provided is an irradiation-crosslinked ethylene propylene diene monomer (EPDM) composition containing: EPDM 30 to 80 phr (parts per hundred resin) free of a crosslinking agent, a polyolefin (PO) resin 10 to 50 phr, a silicone rubber 5 to 40 phr, a flame retardant 20 to 30 phr, a crosslinking accelerator 5 to 10 phr, a crosslinking assistant 1 to 5 phr, an antioxidant 5 to 15 phr, and a lubricant 0.25 to 5 phr. Provided is a cable produced by: providing the irradiation-crosslinked EPDM composition; first kneading the composition using a kneader; second kneading the first kneaded composition using a roll mill; extruding the second kneaded composition using an extruder, and then cutting the extruded composition to produce pellets as a raw material for the cable; forming a cable of a predetermined length by extruding the pellets using an extruder; and irradiation-crosslinking the formed cable using an electron beam accelerator.

9 Claims, 3 Drawing Sheets

RADIATION CROSSLINKING EPDM COMPOSITION AND CABLE PRODUCED THEREBY

CROSS-REFERENCE TO RELATED APPLICATIONS

This application is a national phase under 35 U.S.C. § 371 of International Application No. PCT/KR2018/010292, filed Sep. 4, 2018, which claims the benefit of priority to Korean Patent Application No. 10-2017-0114596, filed Sep. 7, 2017. The contents of the referenced patent applications are incorporated into the present application by reference.

FIELD OF THE INVENTION

The present disclosure relates to an irradiation-crosslinked EPDM composition and a cable made of the same. More specifically, the present disclosure relates to an irradiation-crosslinked EPDM composition used for producing a vehicle battery cable and a cable produced using the composition.

BACKGROUND ART

In general, a battery cable for a car requires high heat resistance and high flexibility in addition to basic physical properties of an electrical wire because the cable is located adjacent to an engine of the car and thus is exposed to physical or chemical adverse conditions such as high temperature, oil, vibration, tight space, etc.

In particular, in recent years, a space of an engine room of the car is minimized in order to achieve compactness and fuel savings. Due to a nature of the vehicle having a lot of functions, various parts are loaded thereon.

Although miniaturization of engine parts is being conducted for efficiency of such an engine room, these engine parts have limitation in structure miniaturization thereof.

In recent years, efforts have been made to maximize efficiency in wire mounting while improving a function of a wire adjacent to the engine part which is an essential component inside the engine room.

In other words, XLPO using a low hardness PO resin is conventionally used as the cable for the vehicle, but does not satisfy the wire mounting efficiency as recently required. Rather, an EPDM cable partially using a CV line has been used.

Therefore, there is a demand for an irradiation-crosslinked type EPDM composition which is produced in the same production process as that of the XLPO but has a high flexibility of EPDM and for a cable made of the irradiation-crosslinked type EPDM composition.

A prior art related to the present disclosure includes Korean patent No. 10-1496967.

DISCLOSURE

Summary of the Invention

The present disclosure was created in response to the above various requirements. A technical purpose of the present disclosure is to provide an irradiation-crosslinked EPDM composition, and a cable made of the same to prevent appearance degradation of the cable due to pinhole occurrence, to be able to be produced by using a general extruder, and to have high productivity.

Further, another technical purpose of the present disclosure is to provide an irradiation-crosslinked EPDM composition having high heat resistance and high flexibility to be used efficiently for a wire for a battery mounted adjacent to an automotive engine room, and provide a cable made of the same.

The purposes of the present disclosure are not limited to the purposes as mentioned above. Other purposes as not mentioned may be clearly understood by those skilled in the art from following descriptions.

A first aspect of the present disclosure provides an irradiation-crosslinked ethylene propylene diene monomer (EPDM) composition containing: EPDM 30 to 80 phr (parts per hundred resin) free of a crosslinking agent, a polyolefin (PO) resin 10 to 50 phr, a silicone rubber 5 to 40 phr, a flame retardant 20 to 30 phr, a crosslinking accelerator 5 to 10 phr, a crosslinking assistant 1 to 5 phr, an antioxidant 5 to 15 phr, and a lubricant 0.25 to 5 phr.

In one embodiment, EPDM includes one or a combination of two among types of EPDMs meeting following requirements: an ENB (ethylene-norbornene) content of 2.5 to 5%, a Mooney viscosity of 22 to 65, a shore A hardness of 59 to 90, and TR-10 of −10 to −12.

In one embodiment, the polyolefin (PO) resin includes one or a combination of at least two among an ethylene-vinyl acetate (EVA) copolymer, a polyolefin elastomer (POE), a partially crosslinked modified PO, and an ethylene-propylene rubber (EPR).

In one embodiment, the silicone rubber has a Shore A hardness of 60 to 70 and is free of a crosslinking agent.

In one embodiment, the flame retardant has a surface coated with silane and includes one or a combination of $Al(OH)_3$ and $Mg(OH)_2$ or may include a Br-based flame retardant.

In one embodiment, the crosslinking accelerator includes one or a combination of ZnO and MgO.

In one embodiment, the crosslinking assistant includes one or a combination of at least two among triallyl isocyanurate (TAIL), triallyl cyanurate (TAC), trimethylopropane trimethacrylate (TMPTMA), and trimethylolpropane triacrylate (TMPTA).

In one embodiment, the antioxidant includes a combination of at least two among phenol-based, phosphite-based, amine-based, and triazole-based antioxidants, and wherein the lubricant include one or a combination of at least two among silicone-based, amide-based and zinc-based lubricants.

A second aspect of the present disclosure provides a cable produced by: providing the irradiation-crosslinked EPDM composition as defined above; first kneading the composition using a kneader; second kneading the first kneaded composition using a roll mill; extruding the second kneaded composition using an extruder, and then cutting the extruded composition to produce pellets as a raw material for the cable; forming a cable of a predetermined length by extruding the pellets using an extruder for a cable; and irradiation-crosslinking the formed cable using an electron beam accelerator.

Other details of the present disclosure are included in following detailed descriptions and drawings.

According to the irradiation-crosslinked EPDM composition and the cable composed of the same in accordance with the present disclosure, deterioration in appearance quality of the cable due to pinholes may be prevented, the cable may be produce using a general extruder, and the cable may be produced at high productivity, and the cable having high heat resistance and high flexibility may be produced.

Thus, the irradiation-crosslinked EPDM composition and the cable composed of the same in accordance with the present disclosure may optimally applied to a small space such as a car engine room in a high temperature environment.

The effects of the present disclosure are not limited to the above Example s. Various effects may be included within the present disclosure.

DETAILED DESCRIPTIONS

Figure 1:
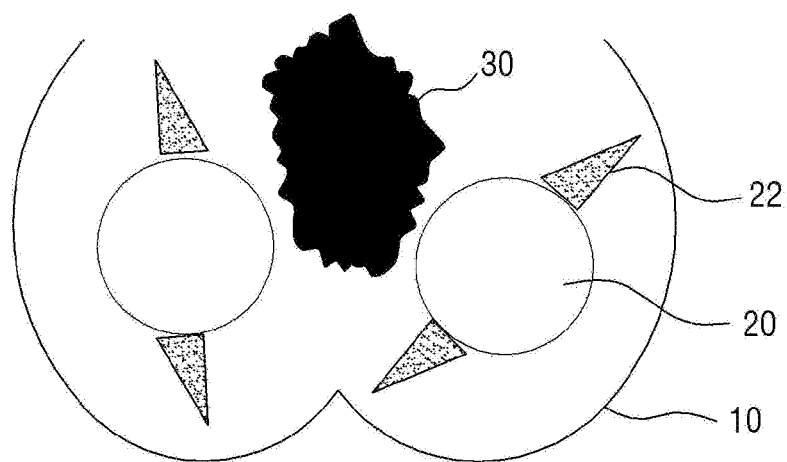
FIG. 1 is a schematic diagram showing a first kneading process for production of a irradiation-crosslinked EPDM composition according to the present disclosure.

Advantages and features of the present disclosure and methods of achieving them will be apparent with reference to embodiments as described below in detail with the accompanying drawings. However, the present disclosure is not limited to the embodiments as disclosed below, but may be implemented in various forms. The present embodiments may be provided only to ensure that the present disclosure is complete and to fully inform the scope of the present disclosure to those of ordinary skill in the technical field to which the present disclosure belongs. The present disclosure is only defined by the scope of the claims Like reference numerals refer to like elements throughout the disclosure.

Thus, in some embodiments, well known process steps, well known structures and well known techniques are not described in detail in order to avoid obscuring the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Further, embodiments described herein will be described with reference to perspective, sectional, side and/or schematic views which are ideal illustrations of the present disclosure. Accordingly, a form of the exemplary diagram may be modified based on producing techniques and/or tolerances. Accordingly, embodiments of the present disclosure are not limited to the specific forms shown, but include variations in forms generated based on a producing process.

Further, in the drawings shown in the embodiment of the present disclosure, each component may be shown to be somewhat enlarged or reduced in consideration of convenience of illustration.

Hereinafter, an irradiation-crosslinked EPDM composition and a cable made thereof according to an embodiment of the present disclosure will be described in detail with reference to the accompanying drawings.

An irradiation-crosslinked EPDM composition according to one embodiment of the present disclosure may contain EPDM (ethylene propylene diene monomer) 30 to 80 phr (parts per hundred resin), a PO resin 10 to 50 phr, a silicone rubber 5 to 40 phr, a flame retardant 20 to 30 phr, a crosslinking accelerator 5 to 10 phr, a crosslinking assistant 1 to 5 phr, an antioxidant 5 to 15 phr, and a lubricant 0.25 to 5 phr.

In this connection, the EPDM may include one or a combination of two among types of EPDMs meeting following requirements: ENB content of 2.5 to 5%, Mooney viscosity of 22 to 65, shore A hardness of 59 to 90, and TR-10 of −10 to −12.

In this connection, ENB refers to a diene contained in EPDM may be 5-ethylene-2-norbornene and may act to provide a site for crosslinking of the EPDM.

That is, when the ENB is not contained in the EPDM, this may result in EPR which is not crosslinked. Therefore, an embodiment of the present disclosure provides the EPDM containing the ENB.

Further, the polyolefin (PO) resin may include one or a combination of two or more among an ethylene-vinyl acetate (EVA) copolymer, a polyolefin elastomer (POE), a partially crosslinked modified PO, and an ethylene-propylene rubber (EPR).

Further, it is preferable to select and use the silicone rubber having a shore A hardness of 60 to 70 and free of a crosslinking agent.

Further, the flame retardant may have a surface coated with silane and may include one or a combination of $Al(OH)_3$ and $Mg(OH)_2$ or include DBDPE as a Br-based flame retardant.

Further, the crosslinking accelerator may include one or a combination of ZnO, MgO, and the like.

Further, the crosslinking assistant may include one or a combination of at least two among triallyl isocyanurate (TAIL), triallyl cyanurate (TAC), trimethylopropane trimethacrylate (TMPTMA), and trimethylolpropane triacrylate (TMPTA).

Further, the antioxidant may include a combination of at least two among phenol-based, phosphite-based, amine-based, and triazole-based antioxidants. The lubricant may include one or a combination of at least two among silicone-based, amide-based and zinc-based lubricants.

The EPDM may act as a main resin in the composition formed by mixing the above components and may be able to be irradiated-crosslinked.

In other words, the conventional EPDM may have a crosslinking agent added thereto. In this connection, a general crosslinking method involves in sulfur crosslinking and peroxide crosslinking. The peroxide crosslinking has the same mechanism as the irradiation-crosslinking. Therefore, the EPDM free of the crosslinking agent may be selected among EPDMs of the peroxide crosslinking type.

Further, as a sub resin, the partially crosslinked modified PO resin and the silicone rubber may be used.

The EPDM free of the crosslinking agent may be used to produce a wire using an general extruder for a wire as in XLPE (crosslinked polyethylene). In a post process, the irradiation-crosslinked EPDM composition may be formed by crosslinking the EPDM free of the crosslinking agent using an electron beam accelerator.

In this connection, a scheme of adding a raw material into the general extruder and a scheme adding a raw material into a rubber extruder are different from each other. Thus, the irradiation-crosslinked EPDM composition should be formed into pellets to comply with the raw material adding method in the general extruder for a wire.

Hereinafter, a process of preparing the irradiation-crosslinked EPDM composition using the above components, and a process of producing a cable using the irradiation-crosslinked EPDM composition prepared by the process will be described.

Figure 2:
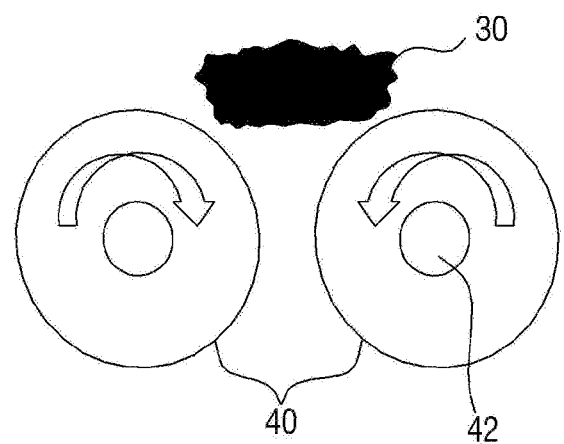
FIG. 2 is a schematic diagram illustrating a second kneading process for production of an irradiation-crosslinked EPDM composition according to the present disclosure.
Figure 3:
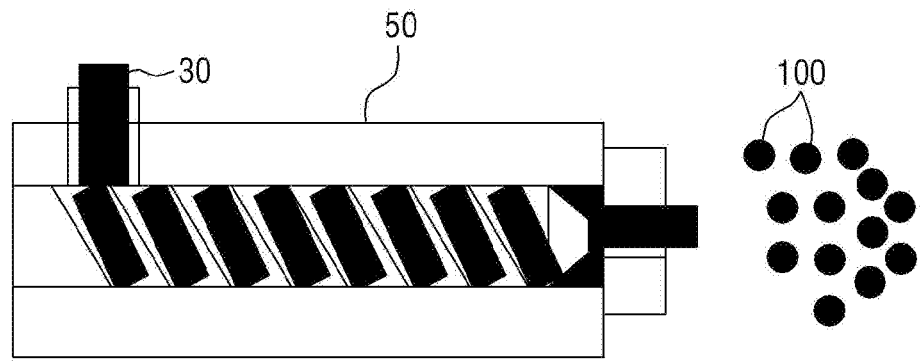
FIG. 3 is a schematic of a process for pelletizing the irradiation-crosslinked EPDM composition produced as in FIG. 1 and FIG. 2.

FIG. 1 is a schematic diagram showing a first kneading process for producing of the irradiation-crosslinked EPDM composition according to Present Example of the present disclosure. FIG. 2 is a schematic diagram showing a second kneading process for producing of the irradiation-crosslinked EPDM composition according to Present Example of the present disclosure. FIG. 3 is a schematic of a process of pelletizing the irradiation-crosslinked EPDM composition prepared by FIG. 1 and FIG. 2.

First, as shown in FIG. 1, a kneader 10 may be used perform a first kneading and mixing of the components.

That is, the EPDM 30 to 80 phr free of the crosslinking agent, the PO resin 10 to 50 phr, the silicone rubber 5 to 40 phr, the flame retardant 20 to 30 phr, the crosslinking accelerator 5 to 10 phr, the crosslinking assistant 1 to 5 phr, the antioxidant 5 to 15 phr, and the lubricant 0.25 to 5 phr are introduced into the kneader, followed by the first kneading process.

Therefore, when a pair of rotating shafts 20 arranged on both sides of the kneader 10 respectively rotate in directions opposite to each other, the kneading is achieved by stirring the components using rotary blades 22 installed on an outer face of each rotating shaft 20.

The components first kneaded by the kneader are subjected to a second kneading process using a roll mill 40, as shown in FIG. 2.

Therefore, as a pair of rotary shafts 42 arranged on both sides of the roll mill 40 respectively rotates in opposite directions to each other, kneading is performed once again. Thus, the irradiation-crosslinked EPDM composition may be formulated.

Then, the irradiation-crosslinked EPDM composition 30 prepared via the two times kneading processes using the kneader 20 and roll mill 30 may be formed into pellets as shown in FIG. 3 to comply with the raw material injection method into the general wire extruder.

That is, the irradiation-crosslinked EPDM composition 30 as subjected to the two times kneading is extruded using an extruder 50. After cooling the composition automatically, the composition is cut and packed into pellets 100.

Then, the pellets 100 are input into the general wire extruder for the XLPE (crosslinked polyethylene) such that a cable having a diameter and a length as required is produced. Then, the cable is subjected to the crosslinking using an electron beam accelerator. Thus, the cable for a car battery is produced.

In order to identify characteristics of the irradiation-crosslinked EPDM composition and the cable made of the same, characteristics experiments were performed using cable samples produced via Optimal Present Example and Comparative Examples 1 to 4. Results are shown in Table 1 below.

TABLE 1

| Items | Raw Materials | Present Example | Comparative Example 1 | Comparative Example 2 | Comparative Example 3 | Comparative Example 4 |
|---|---|---|---|---|---|---|
| Resin | EPDM | 80 | 65 | 65 | 85 | 95 |
|  | PO | 15 | 15 | 30 | 15 | — |
|  | Silicone rubber | 5 | 20 | 5 | — | 5 |
| Flame retardant | DBDPE | 30 | 30 | 30 | 30 | 30 |
| Crosslinking accelerator | ZnO | 5 | 5 | 5 | 5 | 5 |
| Crosslinking assistant | TMPTMA | 1.5 | 1.5 | 1.5 | 1.5 | 1.5 |
| Antioxidant | 1010, 1024, 445, and 412S | 10 | 10 | 10 | 10 | 10 |
| Lubricant | Zn-Amide | 1 | 1 | 1 | 1 | 1 |

| Test items | Requirements | Test condition | Present Example | Comparative Example 1 | Comparative Example 3 | Comparative Example 3 | Comparative Example 4 |
|---|---|---|---|---|---|---|---|
| Tensile strength (Kgf/mm$^2$) | 0.8 or greater | Room temperature | 1.12 | 0.7 | 1.23 | 1.15 | 0.95 |
| Elongation (%) | 400 or greater | Room temperature | 690 | 750 | 650 | 680 | 700 |
| Shore A hardness | 75 or smaller | Room temperature | 74 | 72 | 78 | 75 | 73 |
| Elongation (%) after heat-resistance | 80% or greater compared to that at room temperature | 180° C. × 168 h | 92 | 82 | 90 | 84 | 87 |
| Tensile strength (Kgf/mm$^2$) after heat-resistance | 80% or greater compared to that at room temperature |  | 85 | 86 | 82 | 76 | 83 |

TABLE 1-continued

| | | | | | | | |
|---|---|---|---|---|---|---|---|
| Extrusion characteristic (appearance) | Good | Room temperature | Good | Bad | Bad | Bad (material aggregation) | Bad (material aggregation) |

As shown in Table 1, in the optimal Present Example, a content of the EPDM without the crosslinking agent is 80 phr, a content of the PO resin is 15 phr, a content of the silicone rubber is 5 phr, a content of the flame retardant DBDPE is 30 phr, a content of ZnO as the crosslinking accelerator is 5 phr, a content of TMPTMA as the crosslinking assistant is 1.5 phr, a content of 1010, 1024, 445, and 412S as the antioxidant is 10 phr, a content of Zn-amide as the lubricant is 1 phr. The components are mixed with each other and the mixture is subjected to the first kneading process using the kneader, and to the second kneading process using the roll mill. Then, the resulting product is formed into pellets as a raw material using the extruder. A crosslinking agent is added to and dispersed in the raw material using a roll mill, which is then crosslinked at 180° C. for 10 mins using a Hot-press. Then, we evaluated physical properties of the crosslinked composition.

Further, extrusion characteristics of the pellet-type materials are also evaluated using a single 50 mm extruder.

For reference, the antioxidant 1010 is a primary antioxidant, the antioxidant 1024 is a metal deactivator, the antioxidant 445 is an amine based high heat-resistance stabilizer, and the antioxidant 412S is a sulfur-based high heat-resistance stabilizer.

From the result of experiments on the properties of the cable produced by the optimal Present Example, it may be seen that all of the tensile strength, the elongation, the shore hardness, the elongation after heat-resistance, and the tensile strength after heat-resistance, and the extrusion characteristic of the cable satisfy the requirements.

On the other hand, in the Comparative Example 1 to Comparative Example 4 having different compositions of the components as shown in Table 1, some requirements are satisfied, while the other requirements are not met. In particular, the extrusion characteristics (appearance) of the cables in the Comparative Example 1 to Comparative Example are not able to meet the requirement.

In other words, in Comparative Example 1, as the content of the silicone rubber increases compared to the optimal Present Example, the tensile strength is insufficient. It is found that the appearance is poor during extrusion due to severe separability of a conductor and an insulator due to severe separability of the silicone rubber during extrusion.

Further, in Comparative Example 2, as the content of the partially crosslinked modified PO increases compared to the optimal Present Example, this results in poor flow characteristics of the raw material and thus in poor appearance during extrusion. The hardness of the raw material is higher than a target requirement.

Further, in Comparative Example 3, the silicone rubber is not added as compared to the optimal Present Example, and thus pellets stick together after the raw material compounding. Thus, the feeding is not performed smoothly during extrusion due to the phenomenon of pellets sticking together during extrusion such that the extrusion appearance is not good.

Further, in Comparative Example 4, the modified PO is not added compared to the optimal Present Example, and, thus, a shape of the pellet itself is not maintained well. The poor extrusion appearance is identified due to material aggregation in a screw feeding process during extrusion In one example, compounding is performed using the irradiation-crosslinked EPDM composition produced based on the composition ratio in accordance with the present disclosure. Then, using the irradiation-crosslinked EPDM composition, a 35 SQ cable sample is fabricated using a 90 mm extruder. Then, the cable is subjected to the irradiating crosslinking process at 13 Mrad using an electron beam accelerator. Then, various characteristics of the cable are evaluated. Results are shown in Table 2 below

TABLE 2

| | | Descriptions | Test result |
|---|---|---|---|
| No. | Test items | Test standard GMW15626 & ISO6722/procedure | (average) |
| 1 | Withstand voltage | Should withstand up to 5 kV at 1 kV × 30 min/1 sample being immersed in 3% NaCl for 4 hours, and then 1 kV being applied thereto for 30 minutes and then voltage increases to 5 kV at 500 V/s | Pass |
| 2 | Insulation volume resistivity | $10^9$ Ωmm or greater/1 sample (5 m) being soaked in hot water at 70° C. for 2 hours and resistance being measured at 500 V | $8.21 \times 10^{12}$ Ωmm |
| 3 | Pressure test at high temperature | Should withstand voltage resistance test/3 samples (600 m) being heated for 4 h to 150° C. (applying weight) and being immersed in ice water for 10 seconds, and being subjected to 1 kV × 1 min voltage resistance test | Pass |
| 4 | Short term heat ageing | Should withstand voltage resistance test/3 samples (600 mm) being heated to 175° C. for 240 h, and being bent at −25° C and being subjected to 1 kV × 1 min voltage resistance test | Pass |
| 5 | Long term heat ageing | Should withstand voltage resistance test/3 samples (600 mm) being heated to 150° C for 3000 h, no cracks when being bent around round bar having 5 times outer diameter and being subjected to 1 kV × 1 min voltage resistance test | Pass |
| 6 | Thermal overload | Should withstand voltage resistance test/2 samples (600 mm) being heated at 200° C for 6 h, and being left at room temperature for 16 hours, and bent at room temperature, and then being subjected to 1 kV × 1 min voltage resistance test | Pass |

TABLE 2-continued

| No. | Test items | Descriptions<br>Test standard GMW15626 & ISO6722/procedure | Test result<br>(average) |
|---|---|---|---|
| 7 | Shrinkage by heat | Should not exceed 2 mm/3 samples (100 mm), sample length being measured ar room temperature, and being left at 150° C for 15 min and sample length being measured for comparison | 0 |
| 8 | Low temperature winding | Should withstand voltage resistance test/sample being left for 4 h at −40° C. and then being bent and being subjected to 1 kV × 1 min voltage resistance test | Pass |
|   | Cold impact | Should withstand voltage resistance test/sample (at least 350 mm sample) being taken and 25 mm of both ends of an insulator being removed and the sample being left at −15° C. for 16 h, and then a hammer at 100 mm height falls down to a middle part of the sample, and then being subjected to 1 kV × 1 min voltage resistance rest | Pass |
| 9 | Fluid compatibility | Should withstand voltage resistance test/each sample (600 mm) being tied to 50 mm round rod, soaked in the chemical specified in GM15626 Group1, 2 for 10 seconds and put in oven (1000 h, 240 h) and then being subjected to 1 kV × 1 min voltage resistance test | Pass |
| 10 | Resistance to ozone | Should withstand voltage resistance test/two samples (600 mm) being wound on specified round bar and left in ozone chamber for 192 h to identify cracks | Pass |
| 11 | Resistance to hot water | $10^9$ Ωmm or greater and should not be destroyed/2 samples (2.5 m) being immersed in Nacl 10 g/L at 85° C. for 7 days while 48 dV being applied thereto, and volume resistivity being measured, and this being repeated 5 times, and then sample being subjected to 1 kV × 1 min voltage resistance test | $10^{12}$ Ωmm/<br>pass |
| 12 | Temperature and humidity cycling | Should withstand voltage resistance test/2 samples (600 mm) being wound on specified round rod, and being left on condition of temperature −40 to 150° C., and, then, 8 h × 40 repetitions, and then, sample being subjected to 1 kV × 1 min voltage resistance test | Pass |
| 13 | Resistance to flame propagation | At least 50 mm of sample must remain within 10 seconds in fire test/5 samples (at least 600 mm) being inclined and being fired in 10 seconds | 0 |
| 14 | Tensile strength | 0.8 kgf/mm² or greater/sample free of conductor being clamped by chuck and tensile strength being measured | 1,115 |
| 15 | Elongation | 400% or greater/sample free of conductor being clamped by chuck and elongation being measured | 655 |
| 16 | Heat-resistance residual tensile stress | For reference test, specimen without conductor being left at 180° C. for 168 h and then chucked in the same way as above and tensile strength being measured, and then, being compared with that at room temperature | 87% |
| 17 | Heat-resistance residual elongation | For reference test, specimen without conductor being left at 180° C. for 168 h and then chucked in the same way as above and elongation being measured, and then, being compared with that at room temperature | 96% |

Figure 4:
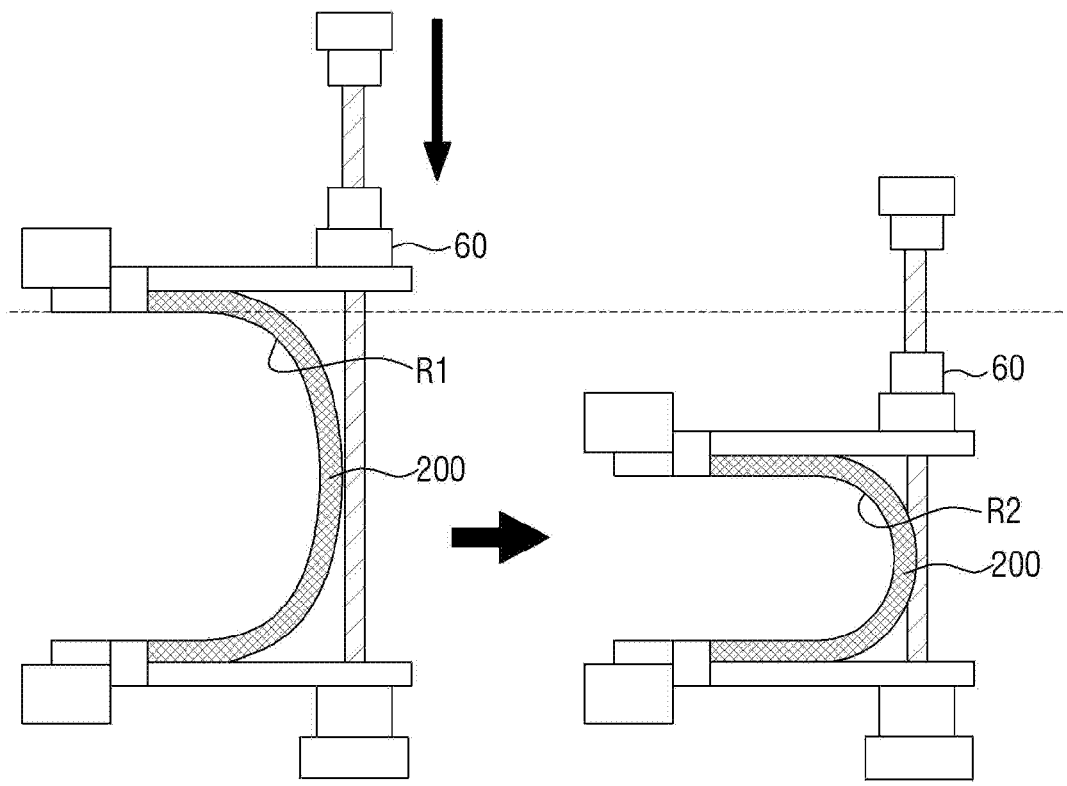
FIG. 4 is a schematic diagram illustrating a process of performing a flexibility test of a cable sample produced using the irradiation-crosslinked EPDM composition according to the present disclosure on a jig.
Figure 5:
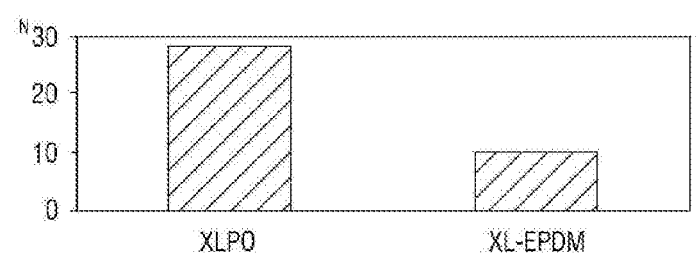
FIG. 5 includes data illustrating a maximum load N when a bending radius R1 and R2 is 40 mm.

Samples were prepared that were larger than or equal to 400 mm according to Present Example. A compression test was conducted using a jig 60 as shown in FIG. 4. In this connection, a maximum load N was measured when a bending radius R1 and R2 is 40 mm. Results are as shown in FIG. 5 and Table 3.

| Composition | XPLO 35SQ | XL-EPDM 35SQ | Comparison |
|---|---|---|---|
| Flexibility (N) | 28 | 10 | 64% ▲ |

That is, in the cable produced using the irradiation-crosslinked EPDM composition according to the Present Example of the present disclosure, a flexibility is improved by 64% over a conventional cable.

In a general rubber, pinholes (fine holes) are generated in an insulator due to crosslinking at high temperature and high pressure steam after wire extrusion. However, in the Present Example of the present disclosure, after extrusion of the irradiation-crosslinked EPDM composition, the irradiation crosslinking is performed in a post process, such that quality defects caused by pinholes may be prevented.

Further, conventionally, a crosslinking agent is added to EPDM itself. Thus, when a temperature control is not appropriate during extrusion, scorch (un-crosslinked rubber partially being crosslinked) may occur, resulting in poor appearance of the insulator. However, according to the Present Example of the present disclosure, there is no crosslinking agent in the raw material. Thus, the occurrence of scorch may be suppressed even when the temperature control is not appropriate.

Further, conventionally, only the cable is formed only by a rubber-only extruder. However, in the Present Example of the present disclosure, the cable may be formed by a general extruder using PVC and PE as a raw material.

Further, conventionally, there is a problem in that workability is degraded due to using a paper or the like as a separator to achieve separability from a conductor. However, according to the Present Example of the present disclosure, workability may be greatly improved due to not using the separator such as paper.

Further, conventionally, peroxide as a crosslinking agent is added to EPDM to generate an odor upon decomposition thereof. However, in the Present Example of the present disclosure, there is no concern about the occurrence of the odor because no crosslinking agent is added to the EPDM.

Those skilled in the art will appreciate that the present disclosure may be embodied in other specific forms without changing the technical spirit or essential features. Therefore, it should be understood that the embodiments as described above are exemplary in all respects and not limiting. The scope of the present disclosure is indicated by the following claims rather than the detailed description. All changes or modifications derived from the meaning and scope of the claims and their equivalents shall be construed as being included in the scope of the present disclosure.

| Reference normal | | | |
|---|---|---|---|
| 10 | Kneader | 30 | Raw material |
| 40 | Roll mill | 50 | Extruder |
| 100 | Pellets | 60 | Jig |

What is claimed is:

1. An irradiation-crosslinked ethylene propylene diene monomer (EPDM) composition for a vehicle cable containing: EPDM 30 to 80 phr (parts per hundred resin), a polyolefin (PO) resin 10 to 50 phr, a silicone rubber 5 to 40 phr, a flame retardant 20 to 30 phr, a crosslinking accelerator 5 to 10 phr, a crosslinking assistant 1 to 5 phr, an antioxidant 5 to 15 phr, and a lubricant 0.25 to 5 phr,
wherein EPDM includes one or a combination of two EPDMs meeting following requirements: an ENB (ethylene-norbornene) content of 2.5 to 5%, a Mooney viscosity of 22 to 65, a shore A hardness of 59 to 90, and TR-10 of −10 to −12, and
wherein the polyolefin (PO) resin includes a mixture of a partially crosslinked modified PO and an ethylene-propylene rubber (EPR).

2. The irradiation-crosslinked EPDM composition of claim 1, wherein the silicone rubber has a hardness a Shore A of 60 to 70 and is free of a crosslinking agent.

3. The irradiation-crosslinked EPDM composition of claim 1, wherein the flame retardant has a surface coated with silane and includes (a) one or a combination of Al(OH)$_3$ and Mg(OH)$_2$ or (b) a Br-based flame retardant.

4. The irradiation-crosslinked EPDM composition of claim 1, wherein the crosslinking accelerator includes one or a combination of ZnO and MgO.

5. The irradiation-crosslinked EPDM composition of claim 1, wherein the crosslinking assistant includes one or a combination of at least two among triallyl isocyanurate (TAIC), triallyl cyanurate (TAC), trimethylopropane trimethacrylate (TMPTMA), and trimethylolpropane triacrylate (TMPTA).

6. The irradiation-crosslinked EPDM composition of claim 1, wherein the antioxidant includes a combination of at least two among phenol-based, phosphite-based, amine-based, and triazole-based antioxidants, and
wherein the lubricant include one or a combination of at least two among silicone-based, amide-based and zinc-based lubricants.

7. A cable produced by:
providing the irradiation-crosslinked EPDM composition of claim 1;
first kneading the composition using a kneader;
second kneading the first kneaded composition using a roll mill;
extruding the second kneaded composition using an extruder, and then cutting the extruded composition to produce pellets as a raw material for the cable;
forming a cable of a predetermined length by extruding the pellets using an extruder for a cable; and
irradiation-crosslinking the formed cable using an electron beam accelerator.

8. The irradiation-crosslinked EDPM composition of claim 1, wherein the composition is comprised in a vehicle cable.

9. The irradiation-crosslinked EDPM composition of claim 8, wherein the vehicle cable has a length and a diameter, and the length is longer than the diameter.

* * * * *